United States Patent
Jones et al.

[15] 3,669,915
[45] June 13, 1972

[54] FLOCCULANTS FROM STARCH GRAFT COPOLYMERS

[72] Inventors: Duane A. Jones, Minneapolis, Minn.; George F. Fanta; Robert C. Burr, both of Peoria, Ill.

[73] Assignee: The United States of America as represented by the Secretary of Agriculture

[22] Filed: Sept. 8, 1970

[21] Appl. No.: 70,491

[52] U.S. Cl. ................................. 260/17.4 GC, 209/5
[51] Int. Cl. .................... B03d 3/06, C08f 1/08, C08f 29/00
[58] Field of Search ........................................... 260/17.4 GC

[56] References Cited

UNITED STATES PATENTS

| | | | |
|---|---|---|---|
| 2,732,317 | 1/1956 | Kirby | 117/63 |
| 2,765,229 | 10/1956 | McLaughlin | 260/17.4 GC |
| 2,922,768 | 1/1960 | Mino et al. | 260/17.4 GC |
| 3,095,391 | 6/1963 | Brockway et al. | 260/17.4 GC |

OTHER PUBLICATIONS

Chemical Abstracts Vol. 60 p. 13,397G (1964) of Belgian Pat. No. 629,203 granted 9/5/1963

Primary Examiner—William H. Short
Assistant Examiner—Edward Woodberry
Attorney—R. Hoffman and W. Bier

[57] ABSTRACT

Highly active flocculants for removing siliceous wastes and other finely divided solid suspensions from water are produced from starch by graft copolymerization with a cationic monomer having quaternary ammonium substituents.

10 Claims, No Drawings

FLOCCULANTS FROM STARCH GRAFT COPOLYMERS

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to graft copolymers from starch and a synthetic cationic monomer and the method of their preparation. More specifically, the invention relates to cationic graft copolymers having highly active flocculating properties.

Starch graft copolymers have been the subject of many patents and publications, most of which describe the reaction of starch with vinyl, acrylic, and methacrylic monomers. These usually result in copolymers having nonionic linear polymer grafts, and only a few have shown any activity as flocculants.

Starch and caustic starch have been used as coagulant aids in water treatment [R. K. Pandit, Environ. Health 7(1): 39–43 (1965)] and the amylopectin component of starch was found superior to whole starch for some applications (French Pat. No. 1,489,195). However, cationic starches (U.S. Pat. No. 3,157,594) and synthetic cationic polymers [Anon., Chem. Eng. News 46(3): 46 (1968)] have been the most widely used compounds for water clarification.

Cationic starches usually have a relatively high degree of substitution (D.S.) (i.e., from about 0.02 to 0.04 substituents/AGU), and since the cationic side chains are not polymeric, they have low molecular weights in comparison to the side chains in graft copolymers.

Starch graft copolymers of the instant invention comprise a novel class of starch derivatives which are totally different from those described above. These new copolymers are characterized by having grafted polymer side chains with a D.S. as low as 0.000015 and molecular weights as high as at least 1 million. Each repeating unit of the high molecular weight side chain contains a pendent cationic substituent, whereas the side chains on classical cationic starches are not polymeric and contain only one cationic substituent per side chain.

These differences in structure are believed to be the reason for the unexpectedly high flocculating activities of the starch graft copolymers compared to those of the high-D.S. cationic starches described in prior art publications.

In accordance with the invention, a method has been found of preparing flocculating agents from starch by forming free radicals on the starch backbone and reacting 2-hydroxy-3-methacryloyloxypropyltrimethylammonium chloride (known as the graft monomer) with the free radicals. The graft monomer attaches itself to starch and polymerizes (known as the grafted polymer) to form water-dispersible starch graft copolymers. The polymerization and grafting reaction is initiated by free radicals formed on the starch by gamma radiation from a source such as cobalt 60, electron beam irradiation, or chemical initiating systems such as ceric salts or ferrous ammonium sulfate-hydrogen peroxide.

Starch graft copolymers formed by the above reaction have the general formula:

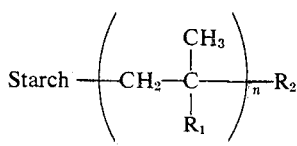

where $R_1$ is $-\overset{O}{\underset{\|}{C}}-O-CH_2-\overset{OH}{\underset{|}{CH}}-CH_2-\overset{+}{N}-(-CH_3)_3$
$Cl^-$ and $R_2$ is 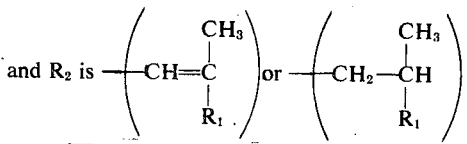

A flocculant is produced when the starch graft copolymer described above is dispersed in water.

DETAILED DESCRIPTION OF THE INVENTION

The invention describes the preparation of starch graft copolymers by the free radical-induced reaction of starch with 2-hydroxy-3-methacryloyloxypropyltrimethylammonium chloride (graft monomer). Copolymers having a wide range of grafted polymer content are readily formed by first forming free radicals on starch and then reacting the activated starch with the graft monomer. Free radical formation may be accomplished with any of the methods well known in the art of polymerization: beta and gamma radiation from sources such as $Co^{60}$, $Sr^{89}$, or any other isotope available for this purpose, chemical initiators such as ceric ions, ferrous ammonium sulfate-hydrogen peroxide, and organic peroxides. The preferred environment for the reaction of activated starch with the graft monomer is an easily stirrable oxygen-free water slurry at about room temperature. It is also preferrable to keep the temperature below that which would cause gelatinization of the starch in order to give a more readily isolable product. The dry granular product can be dispersed in water at a temperature of about 90°–95° C., which will gelatinize the starch backbone.

Starch graft copolymers prepared according to the examples were treated with sodium chloride and exhaustively dialyzed to convert all the quaternary ammonium groups in the grafted polymer to the chloride form. Values for percent (by weight) grafted polymer in the starch graft copolymer were calculated from nitrogen and chlorine content and also by weight loss after acid hydrolysis of the starch moiety to glucose. After acid hydrolysis and dialysis to remove carbohydrate, the number average molecular weight of the grafted polymer was determined on a Melabs Model CSM-2 membrane osmometer using a B-19 membrane. The upper limit of the equipment is a molecular weight of about 1 million and some of the samples had molecular weights in excess of this limit. The D.S. was calculated from the results of the analyses described above.

The starch graft copolymers contained 4.5–15.2 percent grafted polymer. Number average molecular weights of grafted polymer were in the range of about 72,000 to at least 1 million and the grafting frequencies were in the range 2,900 to 66,400 anhydroglucose units (AGU) per grafted branch. The grafting frequencies correspond to a D.S. range of 0.000345 to 0.000015. These figures are given only as examples of polymer structure, and it is assumed that polymers having grafted polymer contents, molecular weights of grafted branches, and grafting frequencies outside these ranges would show unique properties similar to those described. Water extraction and fractional precipitation studies showed that grafted polymer chains were chemically attached to the starch backbone. It is commonly understood in the art that a graft copolymer retains most of the basic properties of each polymer, but it was shown that for flocculation of silica the starch part of the copolymer was not acting merely as a diluent for the cationic branches, but that the chemical attachment of grafted polymer on starch gave a product of greater flocculating properties than a physical mixture of starch and a polymer of 2-hydroxy-3-methacryloyloxypropyltrimethylammonium chloride isolated from acid hydrolysis of a starch graft copolymer containing 15.2 percent grafted polymer. At all flocculant concentrations studied, the starch graft copolymer showed significantly better properties than the mixture.

Colorless and nearly clear water dispersions of the above-described starch graft copolymers were found to possess unexpectedly high activity as flocculants for suspensions of a number of finely divided solids and have been shown to be particularly effective for the flocculation of silica. This property is important in view of the vast volumes of siliceous waste water produced daily from wet processing of siliceous ores. This waste water must be processed to remove siliceous wastes before reuse or discharge into streams, lakes, etc.

EXAMPLE 1

Powdered wheat starch (100 g.; 9.8 percent moisture; 0.56 equivalent) was irradiated under a nitrogen atmosphere in a cobalt 60 source for 330 minutes at a dose rate of 0.91 Mrad/hour (dosage 5.0 Mrad), transferred to a reaction flask containing a nitrogen-prepurged solution of 18.20 g. graft monomer (2-hydroxy-3-methacryloyloxypropyltrimethylammonium chloride; 91 percent purity; 0.07 equivalent) in distilled water (475 ml.), and stirred for 2 hours at 25° C. under a nitrogen atmosphere. The product was isolated by filtration after dilution of the reaction mixture with 2 volumes of isopropanol, washed successively with isopropanol and acetone, and dried 16 hours in vacuo at 40° C. Product yield was 101 g.; nitrogen content (corrected for moisture and nitrogen content of starch), 0.406 percent. Calculated polymer content of the crude product was 6.9 percent; grafted polymer content of a water-extracted product, 5.2 percent. The grafted polymer had a number average molecular weight of about 400,000 and a D.S. of 0.000022.

The cationic nature of extracted and unextracted products was determined by streaming current measurements of 0.0010 percent dispersions (preheated) with a Waters Associates' Streaming Current Detector. This instrument measures the ionic charge of dispersed colloidal particles. Equilibrium readings for extracted and unextracted products were +19 and +20, respectively, as compared with −18 for starch and −38 for water.

The unextracted starch graft copolymer containing 6.9 percent polymer was evaluated as a silica flocculant. Evaluation was conducted by addition of test reagent dispersions (0.010 percent) to 1.0 percent dispersions of HiSil 233 (colloidal silica manufactured by Columbia Southern) in graduated cylinders. Rates of flocculation and degree of clarification were noted after mixing. The cationic starch graft copolymer gave rapid settling and excellent clarification when used at 0.20 percent based on silica solids. Starch and Q-Tac (a commercial cationic starch—Corn Products Company—made by reacting starch and a glycidyl quaternary amine) were ineffective at addition levels up to 1.0 percent based on silica solids.

EXAMPLE 2

A reaction similar to Example 1 conducted with 36.4 g. of graft monomer instead of 18.2 g. gave 110 g. of product containing 0.84 percent nitrogen (corrected for moisture and nitrogen content of starch). Calculated polymer content of the crude product was 14.4 percent; grafted polymer content, 8.5 percent after extraction with water. The grafted polymer had a number average molecular weight of at least 1 million (this is the limit of the osmometer used for molecular weight determinations) and a D.S. of 0.000015. Ionic charge, as determined with the streaming current detector, was +30 and +36 for extracted and unextracted polymer, respectively. An aqueous dispersion of the unextracted graft copolymer gave rapid settling and excellent clarification of a HiSil 233 slurry (prepared as in Example 1) at 0.10 percent concentration based on silica solids. Genfloc 140 (a cationic polyacrylamide manufactured by General Mills) gave sightly slower flocculation at 0.20 percent based on silica solids.

EXAMPLE 3

A stirred slurry of 200 g., dry basis, of wheat starch [1.23 moles anhydroglucose unit (AGU)] in 1,500 ml. of distilled water was sparged with a nitrogen stream at 25° C. for 1 hour. Ceric ammonium nitrate (0.0152 mole) was added as a 0.1 molar solution in 1 N nitric acid followed after 5 minutes by 210.5 g. of graft monomer (95 percent purity; added as the dry powder). The mixture was stirred at 25° for 3 hours and the reaction then terminated by the addition of 0.5 g. of hydroquinone. The reaction mixture was centrifuged and the insoluble graft copolymer freed of unreacted monomer and ungrafted polymer by washing with water. The copolymer was finally washed with acetone and dried. The grafted polymer content was 12.1 percent. The number average molecular weight of grafted polymer was 72,000 (determined after removal of starch by acid hydrolysis), and the calculated grafting frequency was 3,240 AGU per grafted branch (D.S. 0.000319).

Evaluation as a flocculant was carried out by addition of test reagent dispersions (0.02 percent) to a 3 percent slurry of diatomaceous silica (average particle size of 2.1 $\mu$) at pH 7. At a flocculant concentration of 0.04 percent based on silica solids, 18.9 percent of the silica remained in suspension after a 30-minute settling time, as compared with 84 percent in the absence of flocculant. With Cato 8 (a commercial cationic starch) under the same conditions, 33 percent of the silica remained suspended.

Evaluation as a flocculant was also carried out at pH 6.3 with 1 percent dispersions of HiSil 215 (Columbia Southern) which has been further reduced in particle size by ball milling. At a flocculant concentration of 0.12 percent based on silica solids, 45 percent of the silica remained in suspension after a 30-minute settling time, as compared with 81 percent in the absence of flocculant. No flocculation was observed with Cato 8 under these conditions.

EXAMPLE 4

When Example 3 was repeated with graft monomer which had been recrystallized from isopropanol, a graft copolymer with a grafted polymer content of 15.2 percent was obtained. The molecular weight of grafted polymer was 84,000, and the grafting frequency was 2,900 AGU per grafted branch (D.S. 0.000345).

Evaluation as a flocculant for diatomaceous silica and HiSil 215 was carried out as in Example 3. At a flocculant concentration of 0.04 percent based on silica solids, 14.2 percent of the diatomaceous silica remained in suspension after a 30-minute settling time. At a flocculant concentration of 0.12 percent based on silica solids, 36 percent of the HiSil 215 remained suspended after a 30-minute settling time.

EXAMPLE 5

When the reaction described in Example 3 was run in 10 liters of distilled water, rather than in 1,500 ml., a graft copolymer with a grafted polymer content of 4.5 percent was obtained. The molecular weight of grafted polymer was 80,000, and the grafting frequency was 10,500 AGU per grafted branch (D.S. 0.000095).

Evaluation as a flocculant for HiSil 215 was carried out as in Example 3. At a flocculant concentration of 0.12 percent based on silica solids, 54 percent of the silica remained in suspension after a 30-minute settling time.

We claim:

1. A method of preparing flocculating agents from starch that comprises forming free radicals on the starch backbone and reacting 2-hydroxy-3-methacryloyloxypropyltrimethylammonium chloride with said free radicals to form water-dispersible starch graft copolymers.

2. A method of preparing flocculating agents from starch as described in claim 1 in which free radicals are formed by irradiating the starch with gamma rays from a cobalt 60 source.

3. A method of preparing flocculating agents from starch as described in claim 1 in which free radicals are formed by reacting the starch with ceric ammonium nitrate in nitric acid.

4. A starch graft copolymer for use as a flocculating agent having the following formula:

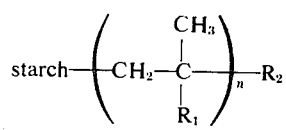

where $R_1$ is 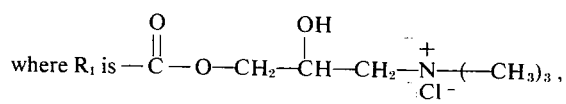

$R_2$ is selected from the group consisting of

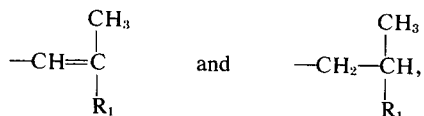

and $n$ is any number such that said graft copolymer has a grafted polymer content of about from 4.5 percent to 15.2 percent, a number average molecular weight of about from 72,000 to at least 1 million at a D.S. level of about from 0.000015 to 0.000345.

5. A starch graft copolymer as described in claim 4 having a grafted polymer content of about 4.5 percent, a number average molecular weight of about 80,000, and a D.S. of about 0.000095.

6. A starch graft copolymer as described in claim 4 having a grafted polymer content of about 5.2 percent, a number average molecular weight of about 400,000, and a D.S. of about 0.000022.

7. A starch graft copolymer as described in claim 4 having a grafted polymer content of about 8.5 percent, a number average molecular weight of about at least 1 million, and a D.S. of about 0.000015.

8. A starch graft copolymer as described in claim 4 having a grafted polymer content of about 12.1 percent, a number average molecular weight of about 72,000, and a D.S. of about 0.000319.

9. A starch graft copolymer as described in claim 4 having a grafted polymer content of about 15.2 percent, a number average molecular weight of about 84,000, and a D.S. of about 0.000345.

10. A flocculant prepared by dispersing the products described in claim 4 in water.

* * * * *